(12) United States Patent
Yoshida et al.

(10) Patent No.: US 6,907,334 B2
(45) Date of Patent: Jun. 14, 2005

(54) ELECTRIC POWER STEERING APPARATUS

(75) Inventors: Kouya Yoshida, Kashiwara (JP); Yasuji Norito, Sakai (JP)

(73) Assignee: Koyo Seiko Co., Ltd., Osaka (JP)

( * ) Notice: Subject to any disclaimer, the term of this patent is extended or adjusted under 35 U.S.C. 154(b) by 202 days.

(21) Appl. No.: 10/458,987

(22) Filed: Jun. 10, 2003

(65) Prior Publication Data

US 2004/0054456 A1 Mar. 18, 2004

(30) Foreign Application Priority Data

Sep. 17, 2002 (JP) ........................................ 2002-270595

(51) Int. Cl.[7] .............................................. B62D 5/04
(52) U.S. Cl. ........................... 701/41; 318/75; 318/722; 318/790; 318/812; 318/280; 180/446
(58) Field of Search ..................... 701/41, 42; 318/434, 318/437, 75, 722, 790, 798, 812, 819, 280; 180/446, 443, 79.1, 444; 340/650, 73; 324/523

(56) References Cited

U.S. PATENT DOCUMENTS

| | | | | |
|---|---|---|---|---|
| 4,765,426 A | * | 8/1988 | Shimizu | 180/446 |
| 5,969,919 A | * | 10/1999 | Kobayashi et al. | 361/23 |
| 6,064,172 A | | 5/2000 | Kuznetsov | |
| 6,439,336 B2 | * | 8/2002 | Noro et al. | 180/404 |
| 6,497,303 B1 | * | 12/2002 | Nishimura et al. | 180/446 |
| 2002/0070072 A1 | * | 6/2002 | Sato | 180/446 |
| 2002/0189893 A1 | * | 12/2002 | Mukai et al. | 180/446 |
| 2003/0011334 A1 | * | 1/2003 | Kifuku | 318/432 |
| 2003/0052639 A1 | * | 3/2003 | Tanaka et al. | 318/632 |
| 2003/0069675 A1 | * | 4/2003 | Kifuku et al. | 701/41 |
| 2003/0102181 A1 | * | 6/2003 | Tokumoto | 180/446 |

FOREIGN PATENT DOCUMENTS

| | | |
|---|---|---|
| DE | 198 11 992 A1 | 9/1999 |
| JP | 7-96387 A1 | 4/1995 |
| JP | 7-096387 | 10/1995 |
| JP | 2662315 | 6/1997 |
| JP | 2662315 A1 | 6/1997 |
| JP | 11-250790 A1 | 9/1999 |
| JP | 11-250790 | 9/1999 |
| JP | 2001-43783 | 2/2001 |
| JP | 2001-043783 A1 | 2/2001 |

OTHER PUBLICATIONS

Searching PAJ; (Patent Abstracts of Japan); JP 07–096387 (translation of Abstract only).
Searching PAJ; (Patent Abstracts of Japan); JP 11–250790 (translation of Abstract only).
Searching PAJ; (Patent Abstracts of Japan); JP 2001–043783 (translation of Abstract only).

* cited by examiner

*Primary Examiner*—Thomas G. Black
*Assistant Examiner*—Tuan C To
(74) *Attorney, Agent, or Firm*—Darby & Darby

(57) ABSTRACT

An electric power steering apparatus for assisting the steering force of a steering member by an electric motor (18) driven by a driving circuit (13) connected to a power supply (P) by power connecting means (15*a*). The electric power steering apparatus comprising: means (12) for detecting a short-circuit failure on the driving circuit (13) and on a wiring connecting the driving circuit (13) and the electric motor (18); power off means (15) for turning off the power connecting means (15*a*) when a short circuit failure is detected; current detecting means (17) for detecting the value of a current flowing between the electric motor (18) and the driving circuit (13) after the power off means (15) turns off the power connecting means (15*a*); and current cutting means (Fa, Fb) for, when the current detecting means (17) detects a current value exceeding a predetermined value, irreversibly cutting off the current whose current value exceeds the predetermined. With such a configuration, it is possible to realize an electric power steering apparatus that has simple structures to enable a reduction in the cost of parts, and prevents the force required for steering from becoming too large at occurring of a short-circuit failure.

6 Claims, 7 Drawing Sheets

ELECTRIC POWER STEERING APPARATUS

BACKGROUND OF THE INVENTION

1. Field of the Invention

The present invention relates to an electric power steering apparatus designed to assist the steering force of a steering member by an electric motor.

2. Description of Related Art

In a conventional electric power steering apparatus, when a switching element constituting a driving circuit of an electric motor is damaged and short-circuits, a relay contact of a power supply system is turned off to cut off power.

However, in the case of a brushless motor, for example, even when the circuit is disconnected and power is cut off, a circuit in which an induced current by the brushless motor flows is formed in at least one of U-, V-, and W-phase circuits of the driving circuit. Therefore, when a steering wheel is operated without activating the electric power steering apparatus, the brushless motor functions as a generator and generates an induced current. Then, there are problems that the steering wheel may become extremely heavy and a variation (torque ripple) may occur in the weight of the steering wheel.

In order to solve these problems, conventionally, the following measures have been taken: a relay contact is connected to a path through which the induced current flows, and the relay contact is turned off at occurring of a short-circuit failure; a joint device such as a clutch is interposed between the motor and the steering system, and the joint device is disconnected at occurring of a short-circuit failure so as to prevent the motor from being rotated by the steering wheel and generating power; further a switching device is disposed in series to the motor, and the switching device is opened when abnormality occurs so as to cut off the path through which the induced current flows.

However, all of these measures suffer from the problems of complicated structures, an increase in the number of parts, and a rise in the cost of parts.

Note that, as a technique for disconnecting the circuit, Japanese Patent Application Laid-Open No.11-250790 (1999) discloses a forced fusing fuse for forcibly fusing a fuse, and a current cutting device. Moreover, Japanese Patent No. 2662315 discloses an overheat preventing device for a heater, for preventing overheating of a heating unit by detecting an abnormal condition in which a temperature fuse portion of an electric fan heater, an electric carpet, or the like does not work properly. Further, Japanese Patent Application Laid-Open No. 2001-43783 discloses protection devices, such as a current fuse, a temperature fuse and a fuse with a resistor, which eliminate the necessity of heating a sealing resin at sealing of an insulation case with the sealing resin, and thereby prevent fusion of a low-melt point alloy or a soluble alloy at sealing and prevent error operation in an actual operation.

BRIEF SUMMARY OF THE INVENTION

The present invention has been made with the aim of solving the above problems, and it is a principal object of the present invention to provide an electric power steering apparatus that has simple structures to enable a reduction in the cost of parts, and prevents the force required for steering from becoming too large at occurring of a short-circuit failure.

By the way, the necessity of cutting a path through which an induced current flows arises when a permanent failure such as a short-circuit failure on a switching element occurs. In such a case, recovery is not required, and it is just necessary to once cut off the path through which the induced current flows at that moment. Accordingly, in order to achieve the above object, an electric power steering apparatus of the present invention is characterized by providing a fuse in a path through which an induced current possibly flows and forcibly fusing the fuse when a short circuit failure is detected.

A first aspect of an electric power steering apparatus of the present invention is an electric power steering apparatus comprising: an electric motor for assisting a steering force of a steering member; a driving circuit for driving said electric motor; power connecting means for connecting a power supply and said driving circuit; short-circuit detecting means for detecting a short-circuit failure on said driving circuit and a short-circuit failure on a wiring connecting said driving circuit and said electric motor; and power off means for disconnecting the connection between said power connecting means and said power supply when said short-circuit detecting means detects a short-circuit failure, and characterized by comprising: current detecting means for detecting a current value of a current flowing between said electric motor and said driving circuit after said power off means disconnects the connection between said power supply and said driving circuit with said power connecting means; and current cutting means for, when said current detecting means detects a current value exceeding a predetermined value, irreversibly cutting off said current whose current value exceeds said predetermined value.

According to the first aspect of such an electric power steering apparatus of the present invention, the steering force of the steering member is assisted by the electric motor which is driven by the driving circuit connected to the power supply by the power connecting means. When a short-circuit failure on the driving circuit and a short-circuit failure on a wiring connecting the driving circuit or the electric motor are detected, the power off means turns off the power connecting means. When it is detected that a current flowing between the electric motor and the driving circuit exceeds a predetermined value after the power off means turns off the power connecting means, the current cutting means irreversibly cuts off the current from the power supply.

Accordingly, it is possible to realize an electric power steering apparatus that has simple structures to enable a reduction in the cost of parts, and prevents the force required for steering from becoming too large at occurring of a short-circuit failure.

A second aspect of an electric power steering apparatus of the present invention is based on the first aspect and characterized in that the current cutting means is composed of fuses connected to coils of a stator of the electric motor.

According to the second aspect of such an electric power steering apparatus of the present invention, in the first aspect, the fuses connected to the coils of the rotor of the electric motor function as the current cutting means.

A third aspect of an electric power steering apparatus of the present invention is an electric power steering apparatus which assists a steering force of a steering member by an electric motor driven by a bridge circuit composed of a plurality of switching elements that are ON/OFF controlled according to control signals supplied from a control circuit, and characterized by comprising: a plurality of fuses provided to cut a closed circuit which is formed at occurring of a short-circuit failure on said switching elements; short-circuited element specifying means for specifying a short-circuited switching element; and means for turning on one or a plurality of switching elements which are not short-circuited so as to cause a current to flow in the fuse for cutting a closed circuit including the switching element specified by said short-circuited element specifying means while bypassing said electric motor.

According to the third aspect of such an electric power steering apparatus of the present invention, the steering force of the steering member is assisted by the electric motor which is driven by the bridge circuit composed of a plurality of switching elements. A plurality of fuses are provided to disconnect a closed circuit which is formed at occurring of a short-circuit failure on the switching elements, and the short-circuited element specifying means specifies a short-circuited switching element. One or a plurality of switching elements which are not short-circuited are turned on so as to cause a current to flow to a fuse for cutting a closed circuit including the short-circuited switching element specified by the short-circuited element specifying means while bypassing the electric motor.

Accordingly, it is possible to realize an electric power steering apparatus that has simple structures to enable a reduction in the cost of parts, and prevents the force required for steering from becoming too large at occurring of a short-circuit failure.

A fourth aspect of an electric power steering apparatus of the present invention is based on the third aspect and characterized by further comprising: a motor voltage detecting circuit for detecting a voltage between both ends of said electric motor; and a current detecting circuit for detecting a current value of a current flowing in said electric motor, and wherein said short-circuited element specifying means specifies a short-circuited switching element, based on the voltage detected by said voltage detecting circuit, the current value detected by said current detecting circuit, and control signals supplied to said plurality of switching elements.

According to the fourth aspect of such an electric power steering apparatus of the present invention, in the third aspect, the voltage detecting circuit detects a voltage between both ends of the electric motor, and the current detecting circuit detects the value of a current flowing in the electric motor. The short-circuited element specifying means specifies a short-circuited switching element, based on the voltage detected by the voltage detecting circuit, the current value detected by the current detecting circuit, and control signals supplied to the plurality of switching elements.

Accordingly, it is possible to realize an electric power steering apparatus that has simple structures to enable a reduction in the cost of parts, and prevents the force required for steering from becoming too large at occurring of a short-circuit failure.

A fifth aspect of an electric power steering apparatus of the present invention is based on the first or third aspect, and characterized in that the power connecting means and the power off means are composed of a fail-safe relay having a normally open contact.

According to the fifth aspect of such an electric power steering apparatus of the present invention, in the first or third aspect, the power connecting means and the power off means are composed of a fail-safe relay having a normally open contact.

The above and further objects and features of the invention will more fully be apparent from the following detailed description with accompanying drawings.

DETAILED DESCRIPTION OF THE PREFERRED EMBODIMENTS

The following description will explain the present invention in detail with reference to the drawings illustrating preferred embodiments thereof.

Embodiment 1

Figure 1:
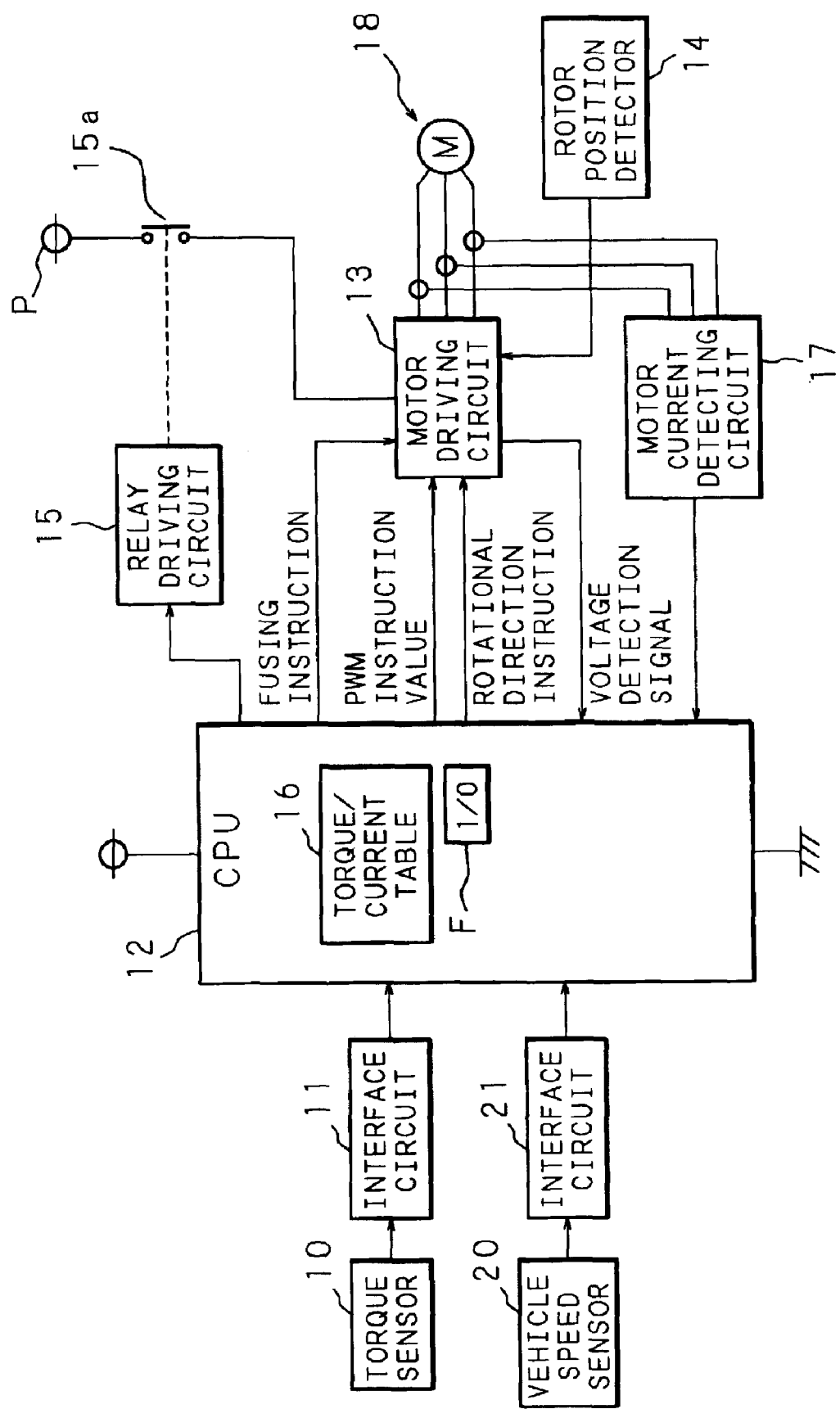
FIG. 1 is a block diagram showing the configuration of essential portion of an electric power steering apparatus according to Embodiment 1 of the present invention.

FIG. 1 is a block diagram showing the configuration of essential portion of an electric power steering apparatus according to Embodiment 1 of the present invention. In this power steering apparatus, a torque detection signal which is detected and outputted by a torque sensor 10 for detecting torque applied to a steering shaft (not shown) is supplied through an interface circuit 11 to a CPU 12, and a vehicle speed signal which is detected and outputted by a vehicle speed sensor 20 for detecting a vehicle speed is supplied through an interface circuit 21 to the CPU 12.

A relay control signal outputted from the CPU 12 is inputted to a relay driving circuit 15 (power off means). The relay driving circuit 15 performs ON/OFF control of a fail-safe relay contact 15a (power connecting means), according to the relay control signal supplied from the CPU 12. Note that the fail-safe relay contact 15a is a normally open contact to realize the fail-safe function, and is normally set in a closed (ON) state by the relay driving circuit 15 when the main power of a vehicle on which the electric power steering apparatus of the present invention is mounted is turned on.

With reference to an internal torque/current table 16 storing the relation between torque and a corresponding target current value in advance, the CPU 12 generates a motor current instruction value (PWM instruction value), based on the torque detection signal, vehicle speed signal and later-described motor current signal. The generated motor current instruction value is supplied to a motor driving circuit 13. The motor driving circuit 13 is supplied with a power supply voltage of a car battery P through the fail-safe relay contact 15a. Accordingly, the motor driving circuit 13 drives and rotates a brushless motor 18, which is a steering assisting electric motor, based on the supplied motor current instruction value.

The CPU 12 also generates a later-described fusing instruction signal and supplies it to the motor driving circuit 13.

When the brushless motor 18 is rotating, a rotor position detector 14 detects the rotor position of the brushless motor 18. The motor driving circuit 13 controls rotation of the brushless motor 18, based on a rotor position signal detected by the rotor position detector 14.

The current value of a motor current flowing in the brushless motor 18 is detected by a motor current detecting circuit 17 (current detecting means), and supplied as a motor current signal to the CPU 12.

Figure 2:
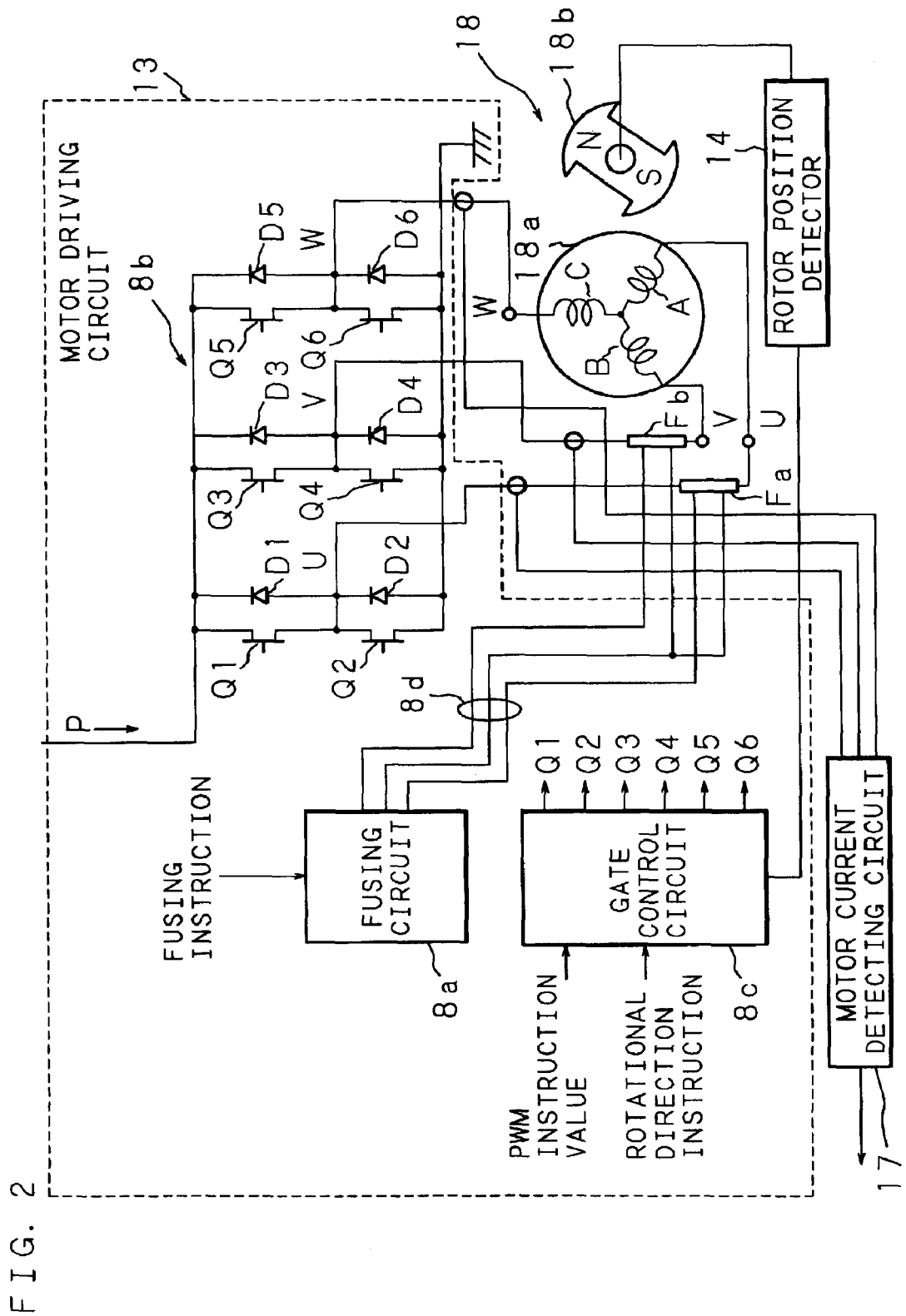
FIG. 2 is a block diagram showing an example of the structures of a brushless motor and a motor driving circuit together with a motor current detecting circuit of the electric power steering apparatus according to Embodiment 1 of the present invention.

FIG. 2 is a block diagram showing an example of the structures of the brushless motor 18 and the motor driving circuit 13 together with the motor current detecting circuit 17. The brushless motor 18 comprises a stator 18a in which coils A, B and C are star-connected; a rotor 18b which is rotated by a rotating magnetic field generated by the coils A, B and C; and the rotor position detector 14 for detecting the rotational position of the rotor 18b.

In the motor driving circuit 13, the power supply voltage of the car battery P is connected to a positive side terminal of a switching circuit 8b. The switching circuit 8b comprises a circuit for the coil A in which transistors Q1 and Q2 that are connected in series between the positive side terminal and the ground terminal and diodes D1 and D2 that are connected in series in the reverse direction are connected in parallel; a circuit for the coil B in which transistors Q3 and Q4 that are connected in series between the positive side terminal and the ground terminal and diodes D3 and D4 that are connected in series in the reverse direction are connected in parallel; and a circuit for the coil C in which transistors Q5 and Q6 that are connected in series between the positive side terminal and the ground terminal and diodes D5 and D6 that are connected in series in the reverse direction are connected in parallel, these circuits being connected in parallel.

The other terminal U of the star-connected coil A is connected to a common connection node of the transistors Q1 and Q2 and to a common connection node of the diodes D1 and D2. The other terminal V of the star-connected coil B is connected to a common connection node of the transistors Q3 and Q4 and to a common connection node of the diodes D3 and D4. The other terminal W of the star-connected coil C is connected to a common connection node of the transistors Q5 and Q6 and to a common connection node of the diodes D5 and D6.

The rotational position of the rotor 18b detected by the rotor position detector 14 is transmitted to a gate control circuit 8c. To the gate control circuit 8c, the rotational direction instruction and the motor current instruction value (PWM instruction value) are supplied from the CPU 12. By performing ON/OFF control of each gate of the transistors Q1 to Q6 according to the rotational direction instruction supplied from the CPU 12 and the rotational position of the rotor 18b detected by the rotor position detector 14, the gate control circuit 8c switches the path of the current flowing to the rotor 18a to U-V, U-W, V-W, V-U, W-U, W-V, and U-V, for example, and generates a rotating magnetic field in the rotor 18a.

On the way of wirings connecting the switching circuit 8b to the respective coils A and B, fuses Fa and Fb (current cutting means) are provided, respectively. The fuses Fa and Fb can be constructed such that heating lines 8d to allow the current to flow from a fusing circuit 8a winds round the fuses Fa and Fb or contacts with the same. Accordingly, when the fusing circuit 8a causes the current to flow in the heating lines 8d, the fuses Fa and Fb are fused. The fusing circuit 8a causes the current to flow in the heating lines 8d upon receipt of a fusing instruction from the CPU 12.

The rotor 18b is a permanent magnet, and rotates upon receipt of torque caused by the rotating magnetic field generated by the coils A, B and C, namely the rotor 18a. By PWM (Pulse Width Modulation)—controlling the ON/OFF of the transistors Q1 to Q6 according to the motor current instruction value, the gate control circuit 8c also controls an increase/decrease of the rotational torque of the brushless motor 18.

The diodes D1 to D6 are fly-wheel diodes for protecting the transistors Q1 to Q6 and also make the current continue to flow in the stator 18a.

The motor current detecting circuit 17 detects the current value of the current flowing in each of the terminals U, V and W of the brushless motor 18, and supplies it as a motor current signal to the CPU 12.

Figure 3A:
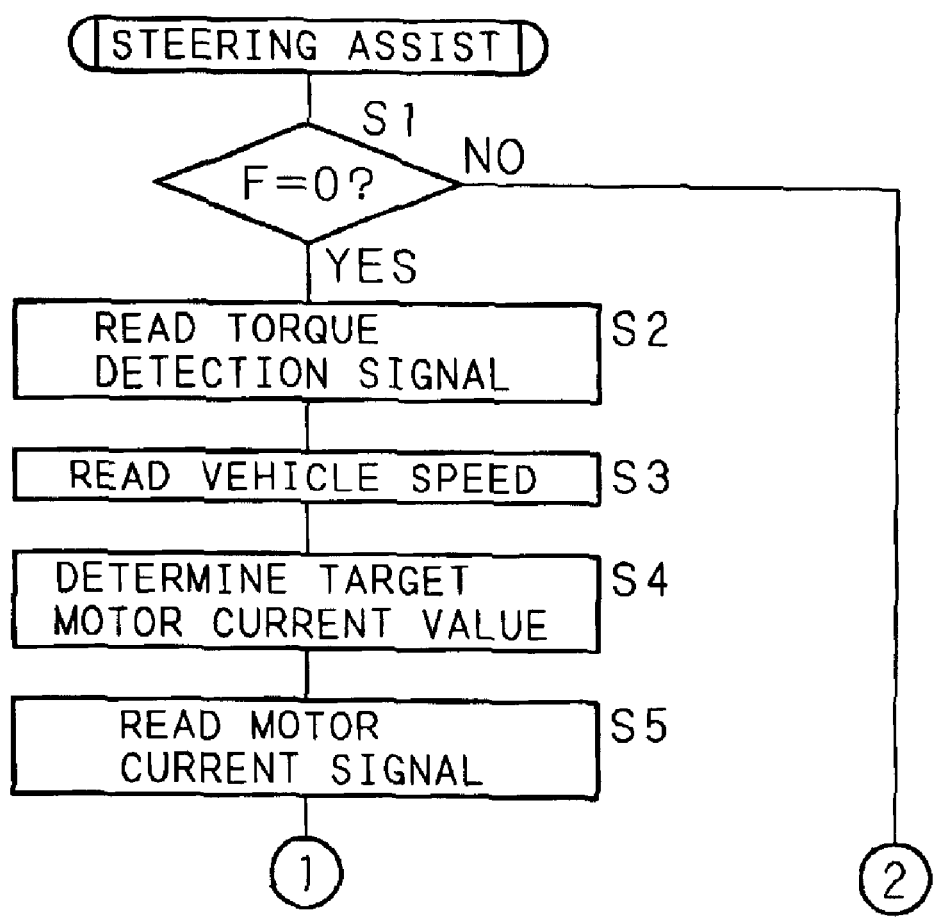
FIG. 3A and FIG. 3B are flow charts showing the processing procedure of a CPU, for explaining the operation of the electric power steering apparatus according to Embodiment 1 of the present invention.
Figure 3B:
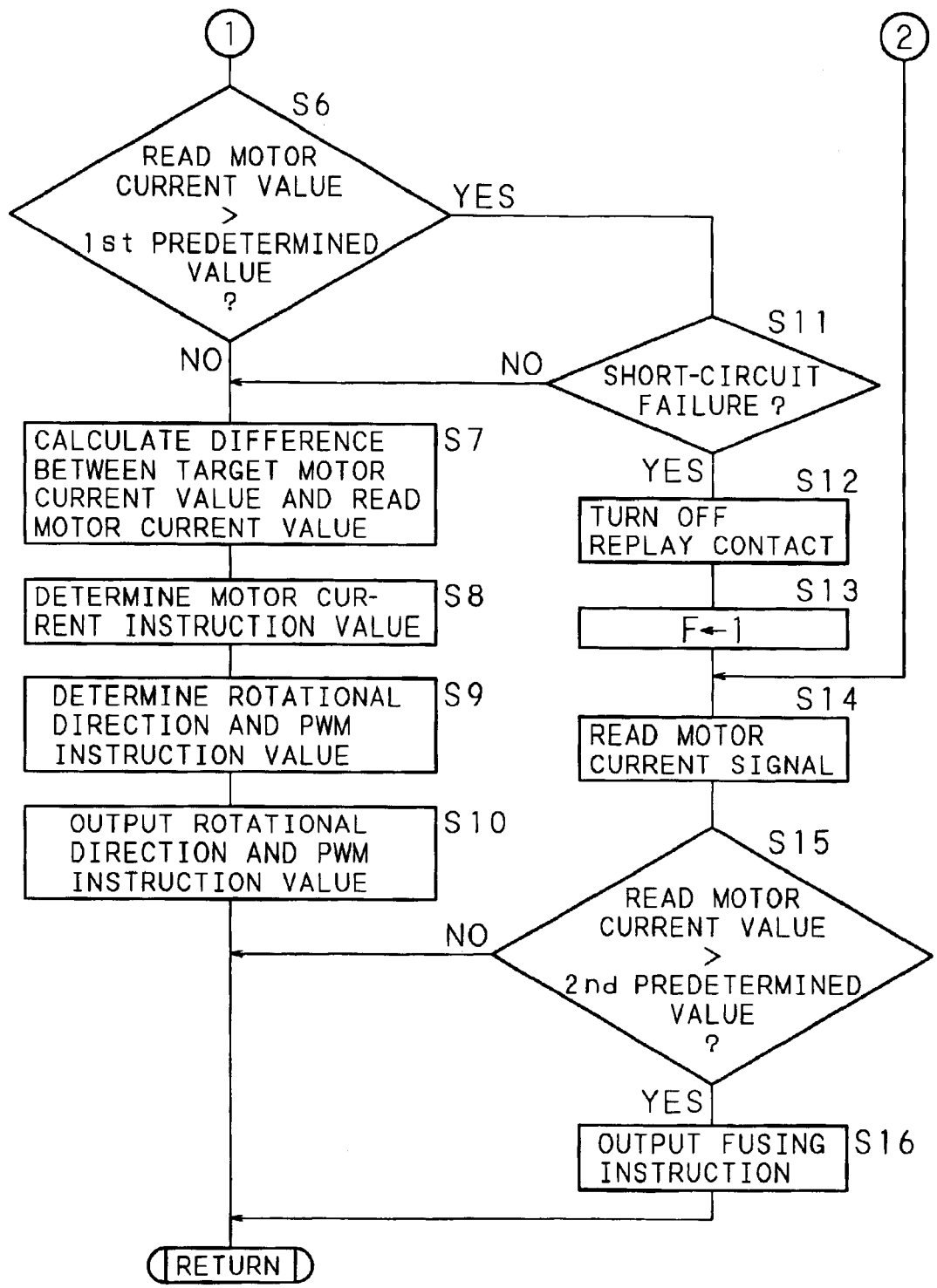

Referring to the flow charts of FIG. 3A and FIG. 3B showing the processing procedure of the CPU 12, the following description will explain the operation of the electric power steering apparatus having such a configuration.

In the steering assist operation, the CPU 12, first, judges whether a flag F is 0 or not (step S1). Assume that the flag F is reset to 0 in the initial state.

When the flag F is 0 (YES in step S1), the CPU 12 reads a torque detection signal detected by the torque sensor 10 through the interface circuit 11 (step S2), and reads a vehicle speed signal detected by the vehicle speed sensor 20 through the interface circuit 21 (step S3).

Next, with reference to the torque/current table 16, the CPU 12 determines a target motor current value, based on the vehicle speed signal and torque detection signal read in steps S2 and S3, respectively (step S4).

Subsequently, the CPU 12 reads a motor current signal from the motor current detecting circuit 17 (step S5), and judges whether or not the read motor current value exceeds a first predetermined value which is preset as a criterion for a short circuit failure (step S6). When the read motor current value does not exceed the first predetermined value (NO in step S6), the CPU 12 calculates the difference between the target motor current value determined in step S4 and the motor current value read in step S5 (step S7).

Next, based on the difference calculated in step S7, the CPU 12 determines a motor current instruction value so as to cause a current of the target motor current value to flow in the brushless motor 18 (step S8).

Subsequently, the CPU 12 determines a PWM instruction value and a rotational direction corresponding to the motor current instruction value determined in step S8 (step S9), supplies the determined PWM instruction value and rotational direction indicating signal to the motor driving circuit 13 (step S10), and then returns and moves to other process.

The motor driving circuit 13 drives and rotates the brushless motor 18, based on the PWM instruction value and rotational direction indicating signal supplied from the CPU 12 as described above.

In step S6, when the motor current value read in step S5 exceeds the first predetermined value (YES in step S6), the CPU 12 judges whether or not this condition is a short-circuit failure, based on whether or not the condition has continued for a predetermined time (step S11). When it is not a short circuit failure (NO in step S11), the CPU 12 calculates the difference between the target motor current value determined in step S4 and the motor current value read in step S5 (step S7), and then performs the same processes as above.

On the other hand, in step S 11, when the condition in which the motor current value read in step S5 exceeds the first predetermined value has continued for the predetermined time and judged to be a short circuit failure (YES in step S11), then the CPU 12 inputs a relay control signal to the relay driving circuit 15 to turn off the fail-safe relay contact 15a (step S12), and thereby stops the supply of power from the power supply P to the switching circuit 8b and sets the flag F to 1 (step S13).

Next, the CPU 12 reads a motor current signal from the motor current detecting circuit 17 (step S14), and judges whether or not the value of the read motor current signal exceeds a second predetermined value which is much smaller than the first predetermined value (step S15). When the value of the motor current signal read in step S14 does not exceed the second predetermined value (NO in step S15), the CPU 12 returns and moves to other process. Note that the second predetermined value corresponds to the current value of an induced current which is generated when the brushless motor functions as a generator by the operation of the steering wheel.

On the other hand, when the value of the motor current signal read in step S14 exceeds the second predetermined value (YES in step S15), the CPU 12 outputs a fusing instruction to the fusing circuit 8a (step S16), and then returns and moves to other process.

In step S16, when a fusing instruction is given by the CPU 12, the fusing circuit 8a causes the current to flow in the heating lines 8d and thereby fuses the fuses Fa and Fb as described above.

Note that, in step S1, when the flag is not 0, namely is 1 (NO in step S1), the fail-safe relay contact 15a has already been turned off and no steering assistance is performed. Therefore, the CPU 12 reads a motor current signal from the motor current detecting circuit 17 (step S14), and judges whether or not the value of the read motor current signal exceeds the second predetermined value (step S15). The subsequent processes are the same as above.

Embodiment 2

Figure 4:
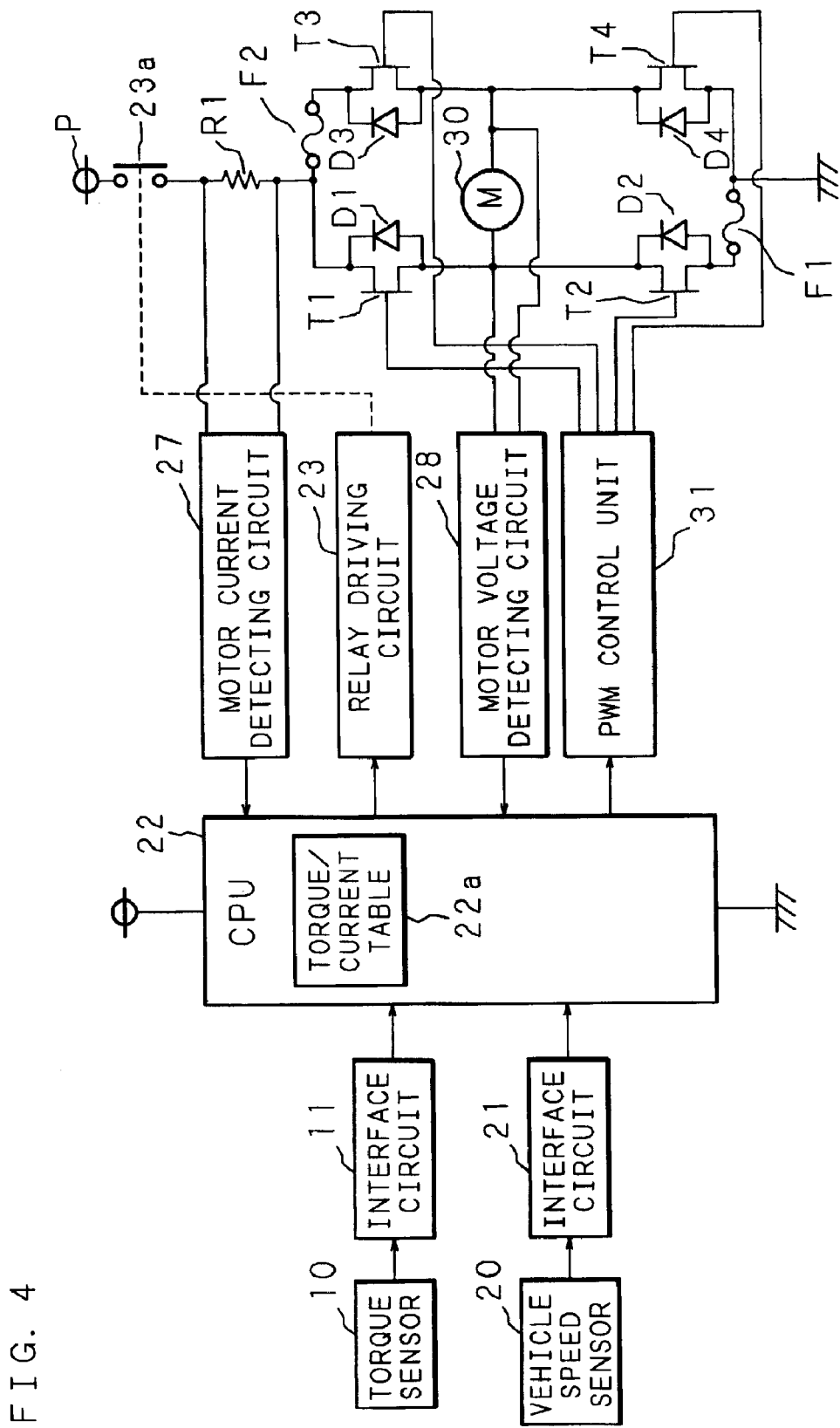
FIG. 4 is a block diagram showing the configuration of essential portion of an electric power steering apparatus according to Embodiment 2 of the present invention.

FIG. 4 is a block diagram showing the configuration of essential portion of an electric power steering apparatus according to Embodiment 2 of the present invention. In this power steering apparatus, power transistors T1, T2, T3 and T4 as switching elements form a bridge circuit between the power supply P and the ground terminal.

This bridge circuit bridges between a connecting node where the power transistors T1 and T2 are connected in series and a connecting node where the power transistors T3 and T4 are connected in series, and a DC motor 30 is connected in series therebetween. Diodes D1, D2, D3 and D4 are connected in parallel to the power transistors T1, T2, T3 and T4, respectively, in a direction opposite to a flowing direction of current from the power supply P. The power supply P and the above mentioned bridge circuit are connected through a fail-safe relay contact 23a and a resistor R1 for current detection.

A fuse F1 is connected between the power transistor T2 and the ground terminal, and a fuse F2 is connected between the resistor R1 and the power transistor T3.

A torque detection signal of a torque sensor 10 for detecting torque applied to a steering shaft (not shown) is supplied through an interface circuit 11 to a CPU 22.

Besides, a vehicle speed signal from a vehicle speed sensor 20 for detecting a vehicle speed is supplied through an interface circuit 21 to the CPU 22.

With reference to an internal torque/current table 22a storing the relation between torque and a corresponding target current value in advance, the CPU 22 generates a motor current instruction value corresponding to the supplied torque detection signal and vehicle speed signal. The generated motor current instruction value includes signal values for controlling the magnitude of the motor current value and the rotational direction, and is inputted to a PWM control unit 31.

The PWM control unit 31 generates a PWM signal having a duty ratio according to the motor current instruction value inputted from the CPU 22. For example, when driving and rotating the DC motor 30 in a positive direction, the PWM control unit 31 switches the power transistor T4 on, and also switches the power transistor T1 by the PWM signal. On the other hand, when driving and rotating the DC motor 30 in the opposite direction, the PWM control unit 31 switches the power transistor T2 on, and also switches the power transistor T3 by the PWM signal.

A voltage between both ends of the resistor RI is supplied to a motor current detecting circuit 27 to detect a voltage value. The detection signal of the motor current detecting circuit 27 is supplied as a feedback signal to the CPU 22.

A voltage between both ends of the DC motor 30 is supplied to a motor voltage detecting circuit 28 to detect a voltage value. The detection signal of the motor voltage detecting circuit 28 is supplied to the CPU 22.

A relay control signal outputted by the CPU 22 is supplied to a relay driving circuit 23. The relay driving circuit 23 performs ON/OFF control of the fail-safe relay contact 23a, according to the relay control signal supplied from the CPU 22. Note that the fail-safe relay contact 23a is a normally open contact to realize the fail-safe function, and is normally set in a closed (ON) state by the relay driving circuit 23 when the main power of a vehicle on which the electric power steering apparatus of the present invention is mounted is turned on.

When the motor current value detected by the motor current detecting circuit 27 exceeds an upper limit that is preset as a criterion for a short circuit failure, or when an excessively large torque value is detected by the torque sensor 10, the CPU 22 supplies a relay control signal to the relay driving circuit 23, thereby turns off the fail-safe relay contact 23a and stops the supply of power from the power supply P to the bridge circuit.

Figure 5A:
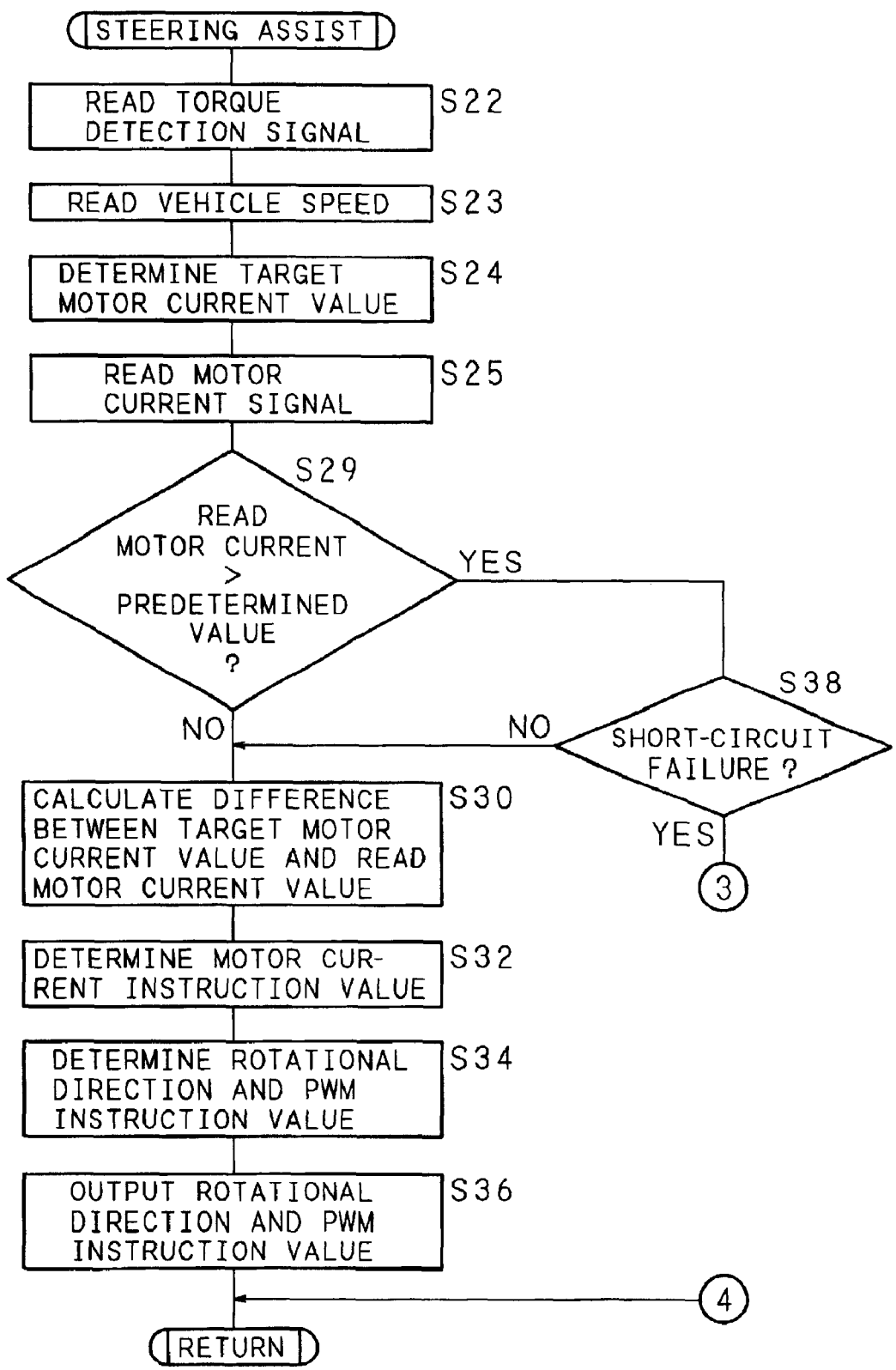
FIG. 5A and FIG. 5B are flow charts showing the processing procedure of a CPU, for explaining the operation of the electric power steering apparatus according to Embodiment 2 of the present invention.
Figure 5B:
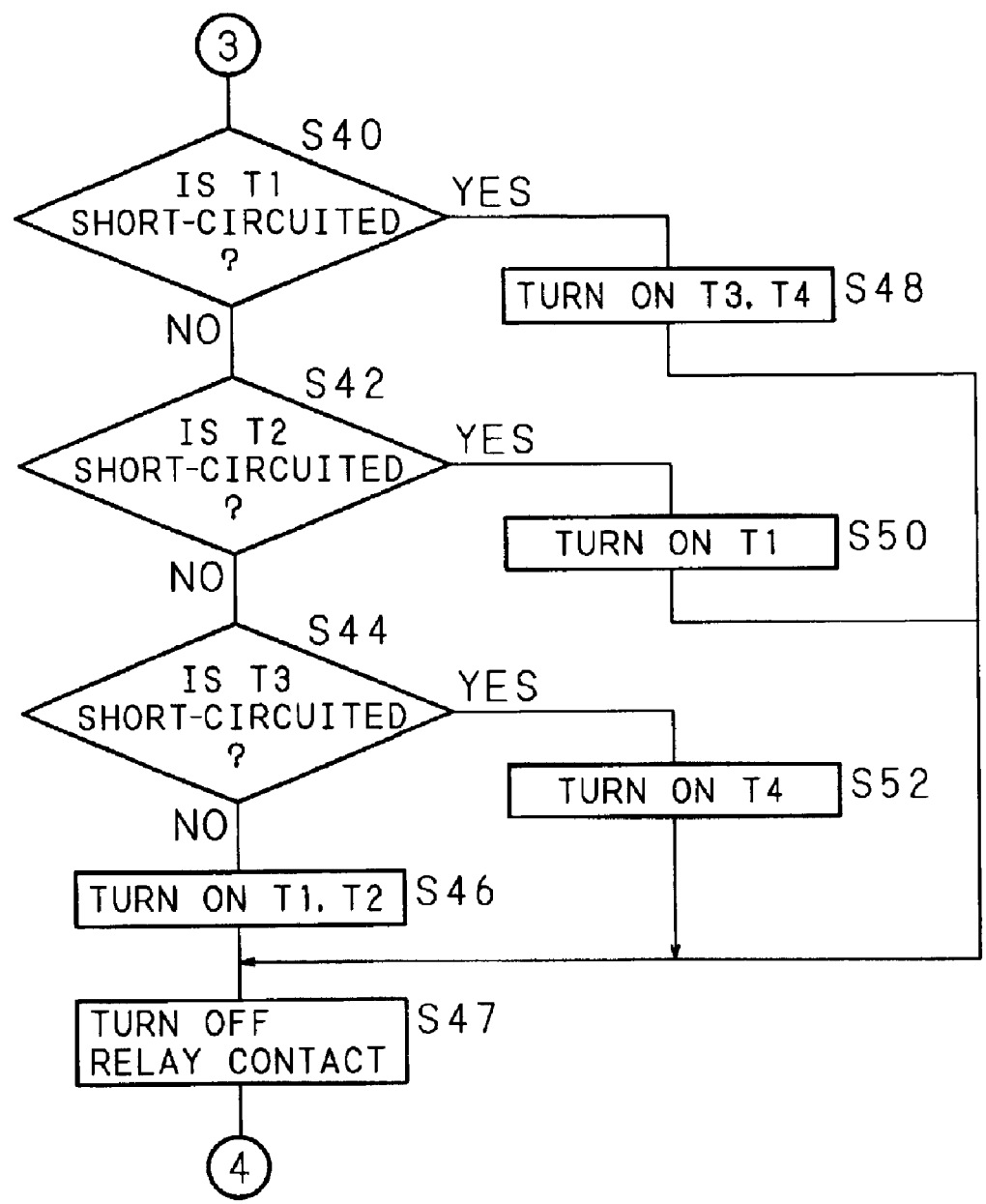

Referring to the flow charts of FIG. 5A and FIG. 5B showing the processing procedure of the CPU 22, the following description will explain the operation of the electric power steering apparatus having such a configuration.

In the steering assist operation, the CPU 22, first, reads a torque detection signal detected by the torque sensor 10 through the interface circuit 11 (step S22), and reads a vehicle speed signal detected by the vehicle speed sensor 20 through the interface circuit 21 (step S24).

Next, with reference to the torque/current table 22a, the CPU 22 determines a target motor current value based on the vehicle speed signal read in step S24 and the torque detection signal read in step S22 (step S26).

Then, the CPU 22 reads a motor current signal from the motor current detecting circuit 27 (step S28), and judges whether or not the read motor current value exceeds the above-mentioned upper limit (step S29). When the read motor current value exceeds the upper limit (YES in step S29), the CPU 22 judges whether or not this condition is a short-circuit failure, based on whether or not the condition has continued for a predetermined time (step S38).

When the value of the read motor current signal does not exceed the predetermined value (NO in step S29), or when the condition is not a short circuit failure (NO in step S38), the CPU 22 calculates the difference between the target motor current value determined in step S26 and the value of the motor current signal read in step S28 (step S30). Then, based on the calculated difference, the CPU 22 determines a motor current instruction value so as to cause a current of the target current value to flow in the DC motor 30 (step S32).

Next, the CPU 22 determines a PWM instruction value and a rotational direction according to the motor current instruction value determined in step S32 (step S34), outputs and supplies the determined PWM instruction value and rotational direction indicating signal to a PWM control unit 31 (step S36), and then returns and moves to other process.

The PWM control unit 31 drives and rotates the DC motor 30, based on the PWM instruction value and rotational direction indicating signal supplied from the CPU 22 as described above.

On the other hand, in step S38, when it is judged that the condition in which the value of the read motor current signal exceeds the predetermined value has continued for the predetermined time and thus is a short circuit failure (YES in step S38), the CPU 22 judges whether or not the power transistor T1 is short-circuited (step S40). When the power transistor T1 is not short-circuited (NO in step S40), the CPU 22 judges whether or not the power transistor T2 is short-circuited (step S42).

When the power transistor T2 is not short-circuited (NO in step S42), the CPU 22 judges whether or not the power transistor T3 is short-circuited (step S44). As described above, the CPU 22 functions as a short-circuited element specifying means.

When the power transistor T3 is not short-circuited (NO in step S44), the CPU 22 determines that the power transistor T4 is short-circuited, and turns on the power transistors T1 and T2 so as to disconnect a closed circuit formed by the power transistors T4, T2 and the DC motor 30 (step S46). Consequently, excessive current flows in the fuse F1 by bypassing the DC motor 30, and the fuse F1 is fused.

Next, the CPU 22 supplies a relay control signal to the relay driving circuit 23 to turn off the fail-safe relay contact 23a (step S47), and returns.

When the power transistor T1 is short-circuited (YES in step S40), the CPU 22 turns on the power transistors T3 and T4 so as to disconnect a closed circuit formed by the power transistors T1, T3 and the DC motor 30 (step S48). Consequently, excessive current flows in the fuse F2 by bypassing the DC motor 30, and the fuse F2 is fused. Next, the CPU 22 supplies a relay control signal to the relay driving circuit 23 to turn off the fail-safe relay contact 23a (step S47), and returns.

When the power transistor T2 is short-circuited (YES in step S42), the CPU 22 turns on the power transistor T1 so as to disconnect a closed circuit formed by the power transistors T2, T4 and the DC motor 30 (step S50). Consequently, excessive current flows in the fuse F1 by bypassing the DC motor 30, and the fuse F1 is fused. Next, the CPU 22 supplies a relay control signal to the relay driving circuit 23 to turn off the fail-safe relay contact 23a (step S47), and returns.

When the power transistor T3 is short-circuited (YES in step S44), the CPU 22 turns on the power transistors T4 so as to disconnect a closed circuit formed by the power transistors T1, T3 and the DC motor 30 (step S52). Consequently, excessive current flows in the fuse F2 by bypassing the DC motor 30, and the fuse F2 is fused. Next, the CPU 22 supplies a relay control signal to the relay driving circuit 23 to turn off the fail-safe relay contact 23a (step S47), and returns.

The CPU 22 judges whether or not each of the power transistors T1, T2, T3 and T4 is short-circuited, based on the detection signal of the motor current detecting circuit 27, detection signal of the motor voltage detecting circuit 28, and control signal to each of the power transistors T1, T2, T3 and T4.

For example, in a condition in which the power transistor T2 is on and the power transistor T3 is switched by the PWM signal, when the detection voltage of the motor voltage detecting circuit 28 is 0 and the value of the detection signal of the motor current detecting circuit 27 has not changed and continues to have the high current value, then the CPU 22 determines that the power transistor T1 is short-circuited. When the detection voltage of the motor voltage detecting circuit 28 is 0 and the value of the detection signal of the motor current detecting circuit 27 has changed by the PWM signal, then the CPU 22 determines that the power transistor T4 is short-circuited. Further, when the detection voltage of the motor voltage detecting circuit 28 is not 0 and the value of the detection signal of the motor current detecting circuit 27 has not changed, then the CPU 22 determines that the power transistor T3 is short-circuited.

In a condition in which the power transistor T4 is on and the power transistor T1 is switched by the PWM signal, when the detection voltage of the motor voltage detecting circuit 28 is 0 and the value of the detection signal of the motor current detecting circuit 27 has not changed and continues to have the high current value, then the CPU 22 determines that the power transistor T3 is short-circuited. When the detection voltage of the motor voltage detecting circuit 28 is 0 and the value of the detection signal of the motor current detecting circuit 27 has changed by the PWM signal, then the CPU 22 determines that the power transistor T2 is short-circuited. Further, when the detection voltage of the motor voltage detecting circuit 28 is not 0 and the value of the detection signal of the motor current detecting circuit 27 has not changed, then the CPU 22 determines that the power transistor T1 is short-circuited.

Note that Embodiment 2 explains an example in which the driving circuit is an H type bridge. However, even when the driving circuit is a multi-phase bridge such as a three-phase bridge, needless to say, the same function and effect can be achieved.

As described in detail above, according to the first, third and fourth aspects of an electric power steering apparatus of the present invention, it is possible to realize an electric power steering apparatus that has simple structures to enable a reduction in the cost of parts, and prevents the force required for steering from becoming too large at occurring of a short-circuit failure.

Moreover, according to the second aspect of an electric power steering apparatus of the present invention, in the first aspect, since the fuse connected to the coil of the stator of the electric motor functions as the current cutting means, it is possible to certainly prevent the electric motor from functioning as a generator.

Furthermore, according to the fifth aspect of an electric power steering apparatus of the present invention, in the first or third aspect, since the power connecting means and power off means are composed of a fail-safe relay having a normally open contact, the electric power steering apparatus always functions on the safe side.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus comprising: an electric motor for assisting a steering force of a steering member; a driving circuit for driving said electric motor; power connecting means for connecting a power supply and said driving circuit; short-circuit detecting means for detecting a short-circuit failure on said driving circuit and a short-circuit failure on a wiring connecting said driving circuit and said electric motor; and power off means for disconnecting the connection between said power connecting means and said power supply when said short-circuit detecting means detects a short-circuit failure, said electric power steering apparatus further comprising:

current detecting means for detecting a current value of a current flowing between said electric motor and said driving circuit after said power off means disconnects the connection between said power supply and said driving circuit with said power connecting means; and current cutting means for, when said current detecting means detects a current value exceeding a predetermined value, irreversibly cutting off said current whose current value exceeds said predetermined value.

2. The electric power steering apparatus as set forth in claim 1, wherein said current cutting means is composed of fuses connected to coils of a stator of said electric motor.

3. The electric power steering apparatus as set forth in claim 1, wherein said power connecting means and said power off means are composed of a fail-safe relay having a normally open contact.

4. An electric power steering apparatus which assists a steering force of a steering member by an electric motor driven by a bridge circuit composed of a plurality of switching elements that are ON/OFF controlled according to control signals supplied from a control circuit, said electric power steering apparatus comprising:

a plurality of fuses provided to cut a closed circuit which is formed at occurring of a short-circuit failure on said switching elements;

short-circuited element specifying means for specifying a short-circuited switching element; and means for turning on one or a plurality of switching elements which are not short-circuited so as to cause a current to flow in the fuse for cutting a closed circuit including the switching element specified by said short-circuited element specifying means while bypassing said electric motor.

5. The electric power steering apparatus as set forth in claim 4, further comprising:

a motor voltage detecting circuit for detecting a voltage between both ends of said electric motor; and a current detecting circuit for detecting a current value of a current flowing in said electric motor, and wherein said short-circuited element specifying means specifies a short-circuited switching element, based on the voltage detected by said voltage detecting circuit, the current value detected by said current detecting circuit, and control signals supplied to said plurality of switching elements.

6. The electric power steering apparatus as set forth in claim 4, wherein said power connecting means and said power off means are composed of a fail-safe relay having a normally open contact.

* * * * *